US010131014B2

(12) United States Patent
Kuchuk-Yatsenko et al.

(10) Patent No.: US 10,131,014 B2
(45) Date of Patent: Nov. 20, 2018

(54) MACHINE FOR FLASH-BUTT WELDING OF RAILS

(71) Applicant: E.O. Paton Electric Welding Institute of the National Academy of Sciences of Ukraine, Kiev (UA)

(72) Inventors: Sergii I. Kuchuk-Yatsenko, Kiev (UA); Valerii G. Kryvenko, Kiev (UA); Oleksandr V. Didkovskiy, Kiev (UA); Mykola Y. Koval, Kiev (UA); Andrii N. Levchuk, Kiev (UA)

(73) Assignee: E.O. Paton Electric Welding Institute of the Natioanl Academy of Sciences of Ukraine, Kiev (UA)

( * ) Notice: Subject to any disclaimer, the term of this patent is extended or adjusted under 35 U.S.C. 154(b) by 237 days.

(21) Appl. No.: 15/098,827

(22) Filed: Apr. 14, 2016

(65) Prior Publication Data

US 2017/0165782 A1   Jun. 15, 2017

(30) Foreign Application Priority Data

Dec. 15, 2015  (UA) .................................. 201512380

(51) Int. Cl.
| | |
|---|---|
| B23K 11/00 | (2006.01) |
| B23K 11/02 | (2006.01) |
| B23K 11/04 | (2006.01) |
| E01B 29/42 | (2006.01) |
| B23K 101/26 | (2006.01) |

(52) U.S. Cl.
CPC ............ *B23K 11/046* (2013.01); *E01B 29/42* (2013.01); *B23K 2201/26* (2013.01)

(58) Field of Classification Search
CPC .. B23K 11/046; B23K 2201/26; B23K 11/04; B23K 11/00; B23K 11/02; B23K 9/10; E01B 29/42; E01B 29/46
USPC ............. 219/53, 55, 97, 100, 101, 104, 108; 228/44.3
See application file for complete search history.

(56) References Cited

U.S. PATENT DOCUMENTS 5,979,738 A * 11/1999 Kuchuk-Yatsenko ......................
B23K 11/046
219/53
2013/0008874 A1 * 1/2013 Kuchuk-Yatsenko ......................
B23K 11/046
219/55

FOREIGN PATENT DOCUMENTS

| UA | 56986 | 6/2003 |
|---|---|---|
| UA | 101539 | 4/2013 |

* cited by examiner

*Primary Examiner* — Michael G Hoang
(74) *Attorney, Agent, or Firm* — Cesari & McKenna, LLP

(57) ABSTRACT

Application of the machine for flash-butt welding of rails with one rod, which connects two tong-type clamping devices is widening greatly the functional capabilities at its service, both in welding of separate rails and also in repair of rail tracks under the field conditions and in hard-to-reach places such as railway switches and frogs, the underground tracks, rails, which are laid side by side at a close distance, etc., not changing the optimum process and quality of the welded joints.

3 Claims, 3 Drawing Sheets

MACHINE FOR FLASH-BUTT WELDING OF RAILS

CROSS-REFERENCE TO RELATED APPLICATIONS

The present application claims the benefit of Ukranian Patent Application Serial No. 201512380, which was filed on Dec. 15, 2015, by Kuchuk-Yatsenko, et al. entitled Machine for Flash-Butt Welding of Rails, which is hereby incorporated by reference.

TECHNICAL FIELD

Invention pertains to the field of welding, namely to the equipment for the flash-butt welding of rails, and can be used both in welding of separate rails and also in repair of rail tracks under the field conditions and in hard-to-reach places such as railway switches and frogs, the underground tracks, rails, which are laid side by side at a close distance, etc.

BACKGROUND INFORMATION

Known is the machine for the flash-butt welding of rails (Patent of Ukraine No. 56986, of 16 Jun. 2003, Bull. No. 6), comprising two tong-type clamping devices, which are made in the form of two double-arm levers, mounted on a common central axle and isolated one from another, having a feasibility of moving along the axle one relative another, joined between themselves by means of two bimetal current-carrying rods of flashing-upsetting hydraulic cylinders, moreover, each of double-arm levers is hinge-connected by one end to a rod or casing of the hydraulic cylinder of clamping, respectively, and at the another end the clamping and current-carrying jaws are mounted, two welding transformers are built-in into hollow double-arm levers of one of two clamping devices joined by current-carrying jumpers through the current conductive parts of rods of flashing-upsetting hydraulic cylinders to current-carrying clamping jaws.

The closest prototype to the invention is the machine for the flash-butt welding of rails (Patent of Ukraine No. 101539, of 10 Apr. 2013, Bull. No 7), comprising a welding current power source, two tong-type clamping devices made in the form of double-arm levers mounted on a common central axle and isolated one from another, hydraulic cylinders of clamping and displacement of parts being welded.

The above-described machines for the flash butt welding of rails are similar by the design by that the tong-type clamping devices are joined between themselves by means of three rods, moreover, the rods of flashing-upsetting hydraulic cylinders are symmetrically arranged relative to a vertical plane of symmetry of rails and in parallel horizontal plane which is located below the web surface of the rails.

Such arrangement of the flashing-upsetting hydraulic cylinders is the main drawback of the above-described three-rod designs of welding machines-analogs, as this makes it impossible to apply them in welding of rails in hard-to-reach places, in particular, railway switches and frogs, the underground tracks, rails which are laid side by side at a close distance, etc.

SUMMARY

The aim of the invention is the widening of capabilities of the machine for the flash-butt welding of rails.

The put task is solved by that in the machine for the flash-butt welding of rails the pairs of double-arm levers of each tong-type clamping device are mounted on the casing and rod of the hydraulic cylinder of displacement with a feasibility of turning of one lever relative to another one around the axis of the hydraulic cylinder of displacement of one tong-type clamping device relative to another one, which is located in vertical plane of symmetry of the tong-type clamping devices.

Dowels were applied additionally, which prevent through the mechanisms of synchronization the turning of one tong-type clamping device relative to another one around a common axis of rotation of double-arm levers.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
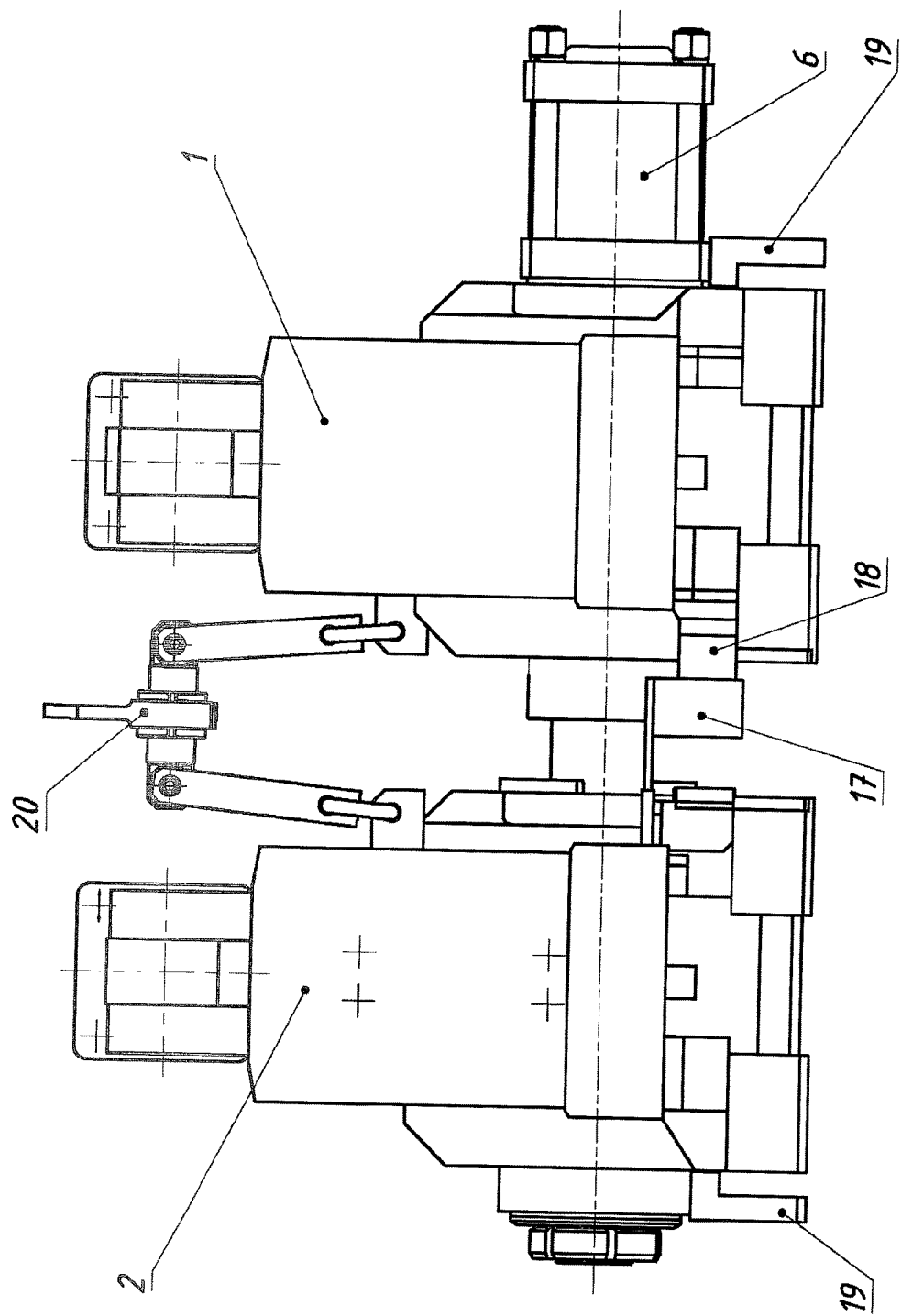
FIG. 1 presents the general view of the machine.
Figure 2:
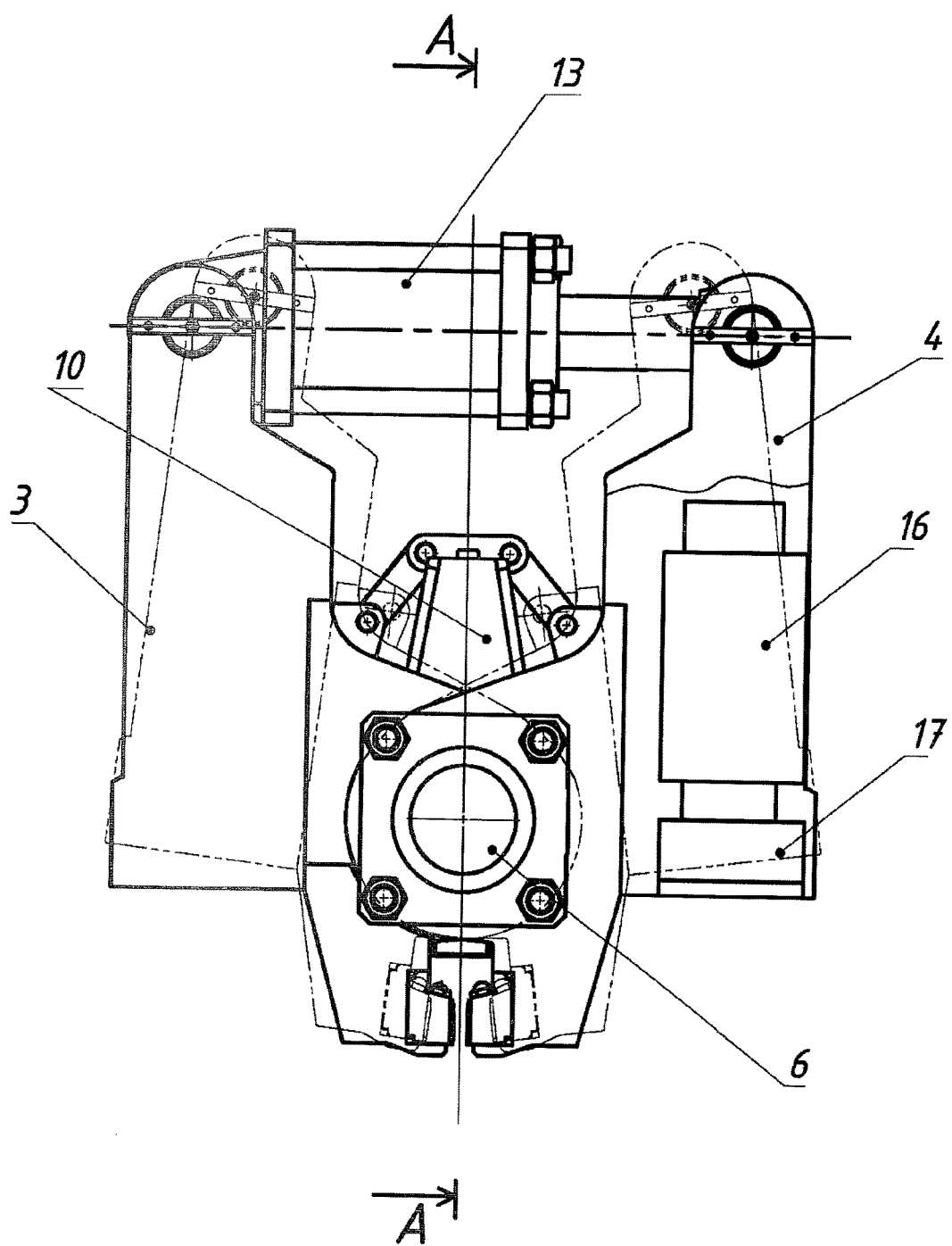
FIG. 2 presents the view of the machine on the side of cylinder of displacement.
Figure 3:
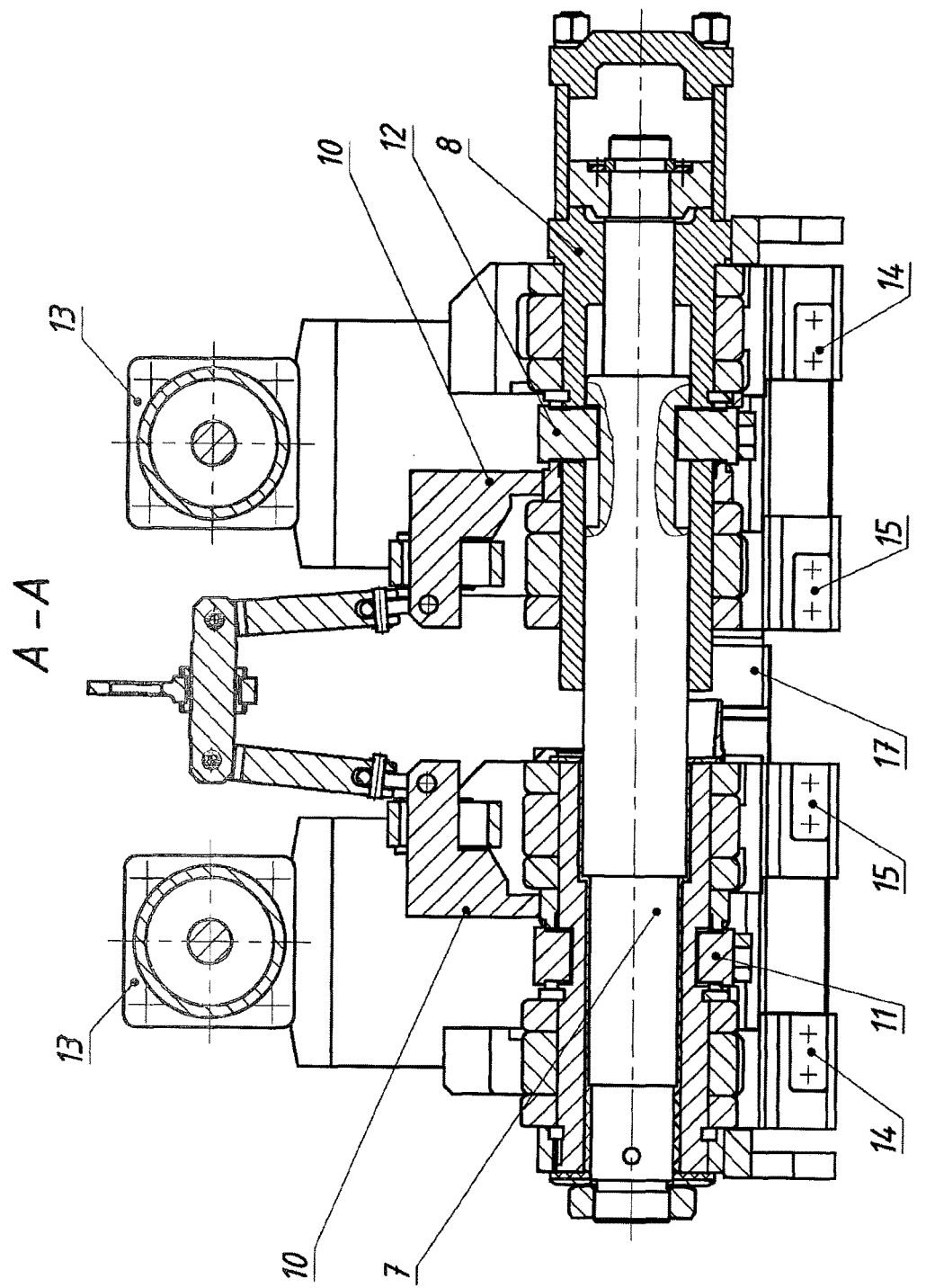
FIG. 3 shows the longitudinal section of the machine.

Improvement of known designs of the machines for the flash-butt welding of rails by reduction of numbers of rods, connecting the tong-type clamping devices between themselves, from three to one. The hydraulic cylinder of displacement of tong-type clamping devices relative one to another, comprising a casing and rod, moreover, pairs of double-arm levers of each tong-type clamping device are mounted on the casing and rod of the hydraulic cylinder of displacement providing the possibility of turning of one lever relative to another around the axis of the hydraulic cylinder of displacement which is located in vertical plane of symmetry of pairs of double-arm levers of each tong-type clamping device. Dowels are applied additionally which prevent through mechanisms of synchronizing the turning of one tong-type clamping device relative to another one around the common axis of rotation of double-arm levers.

The machine for the flash-butt welding of rails comprises two tong-type clamping devices 1 and 2, electrically isolated one from another, each of which includes a pair of double-arm levers 3 and 4 with a mechanism of synchronizing 10, moreover, each pair of the double-arm levers 3 and 4 is hinge connected by one ends to a hydraulic cylinder of clamping 13, and at the opposite ends of the levers the clamping 14 and current-carrying 15 jaws are fixed, which are manufactured by the profile of rail webs being welded. The hydraulic cylinder 6 of displacement of the tong-type clamping devices 1 and 2 one relative another, which consists of a casing 8 and rod 7, moreover, the first tong-type clamping device 1 is fixed on the casing 8, and another tong-type clamping device 2 is fixed on the rod 7 providing the feasibility of reciprocal movement of one relative another along the common axis, which was formed by a rod 7 axis and axis of casing 8. The double-arm levers 3 and 4 of each pair of the tong-type clamping devices 1 and 2 are mounted on the casing 8 and rod 7 of hydraulic cylinder of displacement 6 with a feasibility of turning of one lever 3 relative to another lever 4 around the common axis of rotation, which was formed by the axis of rod 7 and axis of casing 8 of hydraulic cylinder of displacement of one clamping device relative to another one along the common axis. Additionally, dowels 11 and 12 are applied, which through the mechanisms of synchronizing 10 prevent the tong-type clamping devices 1 and 2 from turning relative one another around the common axis of rotation of double-arm levers 3 and 4, which was formed by rod 7 axis and casing 8 axis of hydraulic cylinder of displacement 6. The machine has a single welding current source, which includes two welding transformers 16, which electrically connected in parallel and built-in into the hollow double-arm levers 3 and 4 of one of two tong-type clamping devices. The welding current to the clamping current-carrying jaws 15 is supplied by rigid 17 and flexible 18 current carrying jumpers.

The operation of the rail welding machine with one rod, which connects two tong-type clamping devices can be described as follows. In the initial position before clamping the rail ends being welded, the both tong-type clamping devices 1 and 2 are brought apart, and their double-arm levers 3 and 4 are open. A hydraulic valve of clamping is in a neutral position (hydraulic scheme of the machine is not given). The machine by a suspension 20 is lowered to the prepared rail ends to be welded and oriented by catchers 19 along their axes. The command is given from the programming block for rails clamping, a hydraulic valve is transferred into position "Clamping". Oil from the oil pump is supplied by pipelines to the hydraulic cylinders of clamping 13. Under oil pressure the hydraulic cylinders are brought apart, turning the double-arm levers around a common axis of rotation and gradually the operation for clamping of rails by their webs is performed by clamping 14 and current-carrying 15 jaws. After reaching the operating pressure in hydraulic cylinders of clamping 13 the command is given from the programming block for rail welding. After completion of the welding process the command is given for rail unclamping, the hydraulic valve is transferred into position "Open". The clamping cylinders 13 are brought together rotating the double-arm levers 3 and 4 around the common axis and release the welded rail from clamping 14 and current-carrying 15 jaws. The command is given for bringing apart of tong-type clamping devices, the reverse hydraulic valve is transferred into position "Bringing apart" the oil is supplied into cavity of hydraulic cylinder of displacement 6 and tong-type clamping devices are brought apart into the initial position. The machine is ready for fulfillment of the next cycle of rail welding.

The application of the machine for flash-butt welding of rails with one rod, which connects two tong-type clamping devices widens greatly the functional capabilities in its service, both in welding of separate rails and also in repair of rail tracks under the field conditions and in hard-to-reach places, in particular railway switches and frogs, the underground tracks, rails, which are laid side by side at a close distance, etc., not changing the optimum process and quality of welded joints.

What is claimed is:

1. A machine for the flash-butt welding of rails, comprising:
   a welding current power source;
   two tong-type clamping devices electrically isolated one from another, each including a pair of double-arm levers and a mechanism of synchronizing, wherein each double-arm lever of the pair of double-arm levers of each tong-type clamping device is hinge-connected at one end to a clamping hydraulic cylinder and connected at an opposite end to clamping and current-carrying jaws;
   a displacement hydraulic cylinder, comprising a casing and a rod, wherein a first of the two tong-type clamping devices is fixed on the casing and a second of the two tong-type clamping devices is fixed on the rod, configured to provide reciprocal movement of the first of the two tong-type clamping devices relative to the second of the two tong-type clamping devices along an axis of the displacement hydraulic cylinder,
wherein the displacement hydraulic cylinder is arranged in a vertical plane of symmetry with the pair of double-arm levers of each of the two tong-type clamping devices.

2. The machine of claim 1, wherein the pair of double-arm levers of each of the two tong-type clamping devices is mounted so that a first lever of the pair of double-arm levers is rotatable relative to a second lever of the pair of double-arm levers around the axis of the displacement hydraulic cylinder.

3. The machine of claim 2 additionally comprising dowels, wherein the dowels prevent through the mechanisms of synchronizing of the first and the second of the two tong-type clamping devices a turning of the first of the two tong-type clamping devices relative to the second of the two tong-type clamping devices around a common axis of rotation of the pair of double-arm levers of the first of the two tong-type clamping devices and the pair of double-arm levers of the second of the two tong-type clamping devices.

* * * * *